(12) United States Patent
O'Loughlin et al.

(10) Patent No.: US 11,592,401 B2
(45) Date of Patent: Feb. 28, 2023

(54) INSPECTION SYSTEM AND METHOD FOR TURBINE VANES AND BLADES

(71) Applicant: Erodex (UK) Ltd., Halesowen (GB)

(72) Inventors: Richard O'Loughlin, Bromsgrove (GB); Steve Rolinson, Stourport-On-Severn (GB)

(73) Assignee: Erodex (UK) Ltd., Halesowen (GB)

( * ) Notice: Subject to any disclaimer, the term of this patent is extended or adjusted under 35 U.S.C. 154(b) by 420 days.

(21) Appl. No.: 16/634,594

(22) PCT Filed: Jul. 30, 2018

(86) PCT No.: PCT/GB2018/052172
§ 371 (c)(1),
(2) Date: Jan. 28, 2020

(87) PCT Pub. No.: WO2019/025779
PCT Pub. Date: Feb. 7, 2019

(65) Prior Publication Data
US 2020/0209163 A1 Jul. 2, 2020

(30) Foreign Application Priority Data
Jul. 31, 2017 (GB) .................... 1712297

(51) Int. Cl.
*G01N 21/88* (2006.01)
*F01D 21/00* (2006.01)
(Continued)

(52) U.S. Cl.
CPC ....... *G01N 21/8806* (2013.01); *F01D 21/003* (2013.01); *G01B 11/00* (2013.01);
(Continued)

(58) Field of Classification Search
CPC .......... G01N 21/8806; G01N 21/9515; G01N 21/95692; G01N 21/84; F01D 21/003;
(Continued)

(56) References Cited

U.S. PATENT DOCUMENTS 5,054,087 A 10/1991 Carbon et al.
5,281,819 A 1/1994 Keffert et al.
(Continued)

FOREIGN PATENT DOCUMENTS

EP 1016862 A1 7/2000
EP 1318211 A1 6/2003
(Continued)

OTHER PUBLICATIONS

International Search Report and Written Opinion for International Application No. PCT/GB2018/052172 dated Feb. 8, 2019.
(Continued)

*Primary Examiner* — Howard D Brown, Jr.
(74) *Attorney, Agent, or Firm* — Andrus Intellectual Property Law, LLP

(57) ABSTRACT

A turbine blade or vane inspection apparatus comprising a controller, mounting for holding a turbine blade or vane, a source of illumination, and a camera. At least two of the source of illumination, the camera, and the mounting are moveable components. The controller is configured to control the moveable components to (a) position the turbine blade or vane mounted thereon relative to the illumination source so as to provide a contrast of illumination between a feature of the turbine blade or vane and an adjacent surface of the turbine blade or vane and (b), position the camera so that the optical axis of the camera is directed towards the feature. The controller is further configured to determine a dimension and/or shape of the feature based on an image obtained by the camera.

22 Claims, 19 Drawing Sheets

(51) Int. Cl.
    *G01B 11/06* (2006.01)
    *G01B 11/08* (2006.01)
    *G01N 21/95* (2006.01)
    *G01N 21/956* (2006.01)
    *G01B 11/00* (2006.01)
    *G06V 10/88* (2022.01)

(52) U.S. Cl.
    CPC .......... *G01B 11/0625* (2013.01); *G01B 11/08* (2013.01); *G01N 21/9515* (2013.01); *G01N 21/95692* (2013.01); *G06V 10/88* (2022.01); *F05D 2260/80* (2013.01); *F05D 2260/83* (2013.01)

(58) Field of Classification Search
    CPC ..... G01B 11/00; G01B 11/0625; G01B 11/08; G06V 10/88; F05D 2260/80; F05D 2260/83
    See application file for complete search history.

(56) References Cited

U.S. PATENT DOCUMENTS

| | | | | |
|---|---|---|---|---|
| 6,723,951 | B1* | 4/2004 | McGraw | ................ B23K 26/04 |
| | | | | 219/121.71 |
| 6,945,124 | B1 | 9/2005 | Leboeuf et al. | |
| 7,573,586 | B1 | 8/2009 | Boyer et al. | |
| 2011/0180727 | A1 | 7/2011 | Kell et al. | |
| 2014/0300729 | A1* | 10/2014 | Drescher | .......... G01N 21/95692 |
| | | | | 348/92 |

FOREIGN PATENT DOCUMENTS

| | | | |
|---|---|---|---|
| EP | 2385364 | A1 | 9/2011 |
| EP | 2423638 | A2 | 2/2012 |
| WO | 2007020170 | A1 | 2/2007 |
| WO | 2009141606 | A1 | 11/2009 |
| WO | 2015108858 | A1 | 7/2015 |
| WO | 2015124756 | A1 | 8/2015 |

OTHER PUBLICATIONS

International Preliminary Report on Patentability for International Application No. PCT/GB2018/052172 dated Feb. 13, 2020.

Search Report issued in corresponding United Kingdom Patent Application No. 1712297.9, dated Jan. 11, 2018.

\* cited by examiner

Isometric View

Side View

INSPECTION SYSTEM AND METHOD FOR TURBINE VANES AND BLADES

CROSS-REFERENCE TO RELATED APPLICATIONS

This application is the U.S. national stage application of International Application PCT/GB2018/052172, filed Jul. 30, 2018, which international application was published on Feb. 7, 2019, as International Publication WO 2019/025779 A2 in the English language. The International Application claims priority of GB Patent Application 1712297.9, filed Jul. 31, 2017.

FIELD OF THE INVENTION

The invention relates to the inspection of components such as turbine vanes and blades.

BACKGROUND

Turbine vanes and blades such as those used in the aerospace and industrial gas generator industries may include cooling holes. The cooling holes serve to provide external blade cooling by injecting a cooling fluid such as cold air through the holes. This creates a thin film cooling layer on an external surface of a blade that cools the blade and provides some protection from external heat.

Each turbine blade or vane may be manufactured with tens or hundreds of cooling holes that are in the region of a few mm in diameter. As part of the manufacturing process, it is necessary to inspect the cooling holes of a completed blade to ensure that they conform to required quality tolerances. This is particularly important because flaws in cooling holes can lead to blade or vane failures during turbine operation. Traditionally cooling hole inspection has been undertaken by inspectors who manually use pin gauges to individually check that the dimensions of each cooling hole are within the required tolerances. This is a very time-consuming and laborious process.

Attempts have been made to improve this process. Rotary video measurement machines use imaging to automatically determine the dimensions of cooling holes. However there are several disadvantages with this method. Failures occurring at points not at a surface facing a camera are not detected. Furthermore, existing systems are slow to operate. It can take up to 5 minutes to align datums of the imaging device and a hole before measurements can be taken.

It is also desirable for other features of blades to be automatically inspected such as the dimensions (position and width) of slots and the thickness of coatings.

The present invention has been devised with the foregoing in mind.

SUMMARY OF THE INVENTION

According to a first aspect of the invention there is provided a turbine blade or vane inspection apparatus comprising a mounting for holding a turbine blade or vane; a source of illumination, a camera, and a controller. At least two of the source of illumination, the camera, and the mounting are moveable components. The controller is configured to control the movable components to (a) position the turbine blade or vane mounted thereon relative to the illumination source so as to provide a contrast of illumination between a feature of the turbine blade or vane and an adjacent surface of the blade or vane. The controller is also configured to (b) position the camera so that the optical axis of the camera is directed towards said feature, and, to determine a dimension and/or shape of the feature based on an image obtained by the camera.

The controller may be configured to control movement of one or both of the mounting and source of illumination. As used herein, the term "control the movable components" refers to controlling the motion of (or controllably moving) the moveable components so that they are positioned in a desired location and/or orientation.

The illumination source may comprise a fibre optic light source.

It is advantageous for the mounting and camera to be positioned relative (i.e. independently) of the illumination source. This provides for blades/vanes to be positioned so that features such as holes are illuminated from particular directions thereby permitting the camera to take an image that has a contrast that is most suitable for post-processing to enable measurement of a dimension. For example, the invention provides for light to interact with features in order that a clear contrast is provided in an image between different parts of the blade. This ensures that features are easily recognisable by a human or computing device running appropriate software. The inventors have determined that controlling movement of the camera and mounting relative to an illumination source allows a dimension and/or shape of the feature to be more easily and more accurately determined from an image obtained by the camera.

The illumination source may comprise an illumination probe and the controller may be configured to control the movable components to position the turbine blade or vane so that the illumination probe enters an internal passage of the turbine blade or vane and radiation from the illumination probe shines out from the internal passage through one or more cooling holes in the turbine blade or vane.

It is possible for only the illumination probe to be controllably movable and positioned by the controller if the mounting is not moveable.

Radiating light from an internal passage (i.e. through the hole to the adjacent surface) provides for the dimensions of the profile of a hole at the so-called "break-through" point to be measured. The "break-through" point may be the profile of the cooling hole near or at the location where the cooling hole joins the internal passage. Therefore the dimensions may not be easily visible when light is radiated from an illumination source facing the adjacent surface, as is the case in existing systems, due to shadow. It will be appreciated that the break-through point is where a manufacturing defect or failure is most likely to occur. The break-through point may be at the narrowest point of the hole, or at the deepest point of the hole profile from the surface.

The controller may be configured to control the moveable components so that the optical axis of the camera is aligned with a centreline of a cooling hole. The controller may be configured to position the camera so that the optical axis of the camera (such as the optical axis of a lens of the camera) is aligned with a centreline of a cooling hole.

The controller may be configured to determine a circumference size and/or shape of the cooling hole where the cooling hole joins the internal passage. The controller may be configured to determine dimensions of a profile of the cooling hole at the break-through point.

The break-through point may be proximal to (or at) the location where the cooling hole joins the internal passage and it is desirable to measure the dimensions of the hole at this point since, as discussed above, it is usually where failure is most likely to occur.

The controller may be configured to determine a definitive edge of a profile of the cooling hole(s) based on the change of contrast in the image caused by light illuminated from the illumination probe. The definitive edge can be considered to be a virtual edge that can be measured using image processing software installed on a computing device.

The apparatus may be configured for the camera to receive radiation from the illumination probe after the radiation has passed through the cooling hole(s).

The controller may be configured to control the moveable components to (a) position the turbine blade or vane so that the illumination source illuminates a coated surface of the blade or vane so that the illumination source illuminates a coated surface of the blade or vane, and (b), to position the camera so that the optical axis of the camera is directed towards the illuminated surface. The controller may further be configured to determine an acceptable or unacceptable thickness of the coating based on radiation reflected from the illuminated surface.

The controller may be configured to determine an acceptable or unacceptable thickness of coating based on a predetermined relationship between the amount of coating applied and corresponding amount of radiation reflected from the illuminated surface.

Quality control procedures for blades or vanes may include checking that an acceptable level of coating has been applied to the blade or vane. The invention advantageously utilises the contrast determined by an image taken by the camera to determine the thickness of a coating, thereby allowing an operator to quickly and efficiently validate a part.

The feature of the turbine blade or vane may be a slot or opening in the adjacent surface of the blade or vane, and the controller may be configured to control the moveable components to (a) position the turbine blade or vane so that the illumination source illuminates the surface, and (b) to position the camera so that the optical axis of the camera is directed towards the slow or opening, and wherein the controller is further configured to determine the shape of the opening based on the image obtained by the camera.

The mounting may comprise a datum point and the controller may determine the position of the mounting based on the position of the datum point. The controller may comprise memory that stores coordinate positions of features of the blade or vane with respect to the datum point and the controller may be configured to move any of the camera, mounting, and illumination source based on the position of the mounting and stored coordinate positions.

According to a second aspect of the invention there is provided a method for inspecting a turbine blade or vane. The method may comprise the steps of:
controlling moveable components being at least two of a mounting for holding a turbine blade or vane, a camera, and an illumination source, to position the turbine blade or vane relative to the illumination source so as to provide a contrast of illumination between a feature of the turbine blade or vane and an adjacent surface of the blade or vane.
controlling the moveable components so that the optical axis of the camera is directed towards the feature.
determining a dimension and/or shape of the feature based on an image obtained by the camera.

The illumination source may comprise a fibre optic light source.

The illumination source may comprise an illumination probe, and further comprise the step of controlling the moveable components to position the turbine blade or vane so that the illumination probe enters an internal passage of the turbine blade or vane and radiation from the illumination probe shines out from the internal passage through one or more cooling holes in the turbine blade or vane.

The method may further comprise the step of positioning the movable components so that the optical axis of the camera is aligned with a centreline of one of the one or more cooling holes. The step of positioning the movable components so that the optical axis of the camera is aligned with a centreline of one of the one or more cooling holes may comprise moving the camera.

The method may further comprise the step of determining a definitive edge of a profile of the cooling hole(s) based on the change of contrast in the image caused by light illuminated from the illumination probe.

The method may further comprise the step of post-processing the image using imaging software installed on a computing device to determine the definitive edge and use data associated with the definitive edge to determine the dimension and/or shape of the cooling hole(s).

The method may further comprise the step of comparing the dimension and/or shape with a predetermined tolerance range in order to determine if the dimension and/or shape is acceptable or unacceptable.

The method may further comprise the step of receiving the radiation from the illumination probe after the radiation has passed through the cooling hole(s).

According to a third aspect of the invention there is provided a system for inspecting a turbine blade or vane, the system comprising:
a computer terminal having installed software that post-processes images to determine a dimension and/or shape of a feature based on a contrast of illumination between a feature of the turbine blade or vane and an adjacent surface of the blade or vane.
one or more robots for controllably moving at least one of a camera, a mounting for holding a turbine vane or blade, and an illumination source.

The one or more robots may comprise a camera robot for controllably moving a camera, and a component support robot for controllably moving the mounting.

The robots may be controlled by the computer terminal, or a further secondary computer terminal utilising robot software.

The one or more robots may be configured to move the at least one of the camera, the mounting for holding the turbine vane or blade, and an illumination source, by reference to stored coordinates positions of features on the turbine blade or vane with respect to a measurable datum point on the mounting.

According to a fourth aspect of the invention there is provided a turbine blade or vane coating inspection apparatus comprising: a mounting for holding a turbine blade or vane; a source of illumination for illuminating a coated surface of the turbine blade or vane; a camera; and a controller. At least one of the mounting, the source of illumination and the camera is controllably moveable. The controller is configured to: control movement of one or more of the mounting, the source of illumination and the camera so that the optical axis of the camera is directed towards the coated surface of the turbine blade or vane in a predetermined direction; and determine an acceptable or unacceptable thickness of coating based on:
radiation reflected from the illuminated surface as determined from an image obtained by the camera and a predetermined relationship between the amount of coating applied and the corresponding amount of radiation reflected from the illuminated surface.

The apparatus may be configured to determine a coating thickness percentage value for each pixel in the image by determining a pixel brightness value and comparing the pixel brightness value with stored coating percentage values using the predetermined relationship.

The apparatus may be configured to be trained to differentiate between coatings based on stored coating image profiles determined from images of samples having acceptable and unacceptable coating levels.

The time taken to measure a blade or vane (i.e. the TAKT time) using the described apparatus and method is estimated to be 6-7 minutes depending on the topological complexity of the blade or vane. This is much quicker than what would be achieved using a manual or other known imaging procedure.

DETAILED DESCRIPTION

Figure 1:
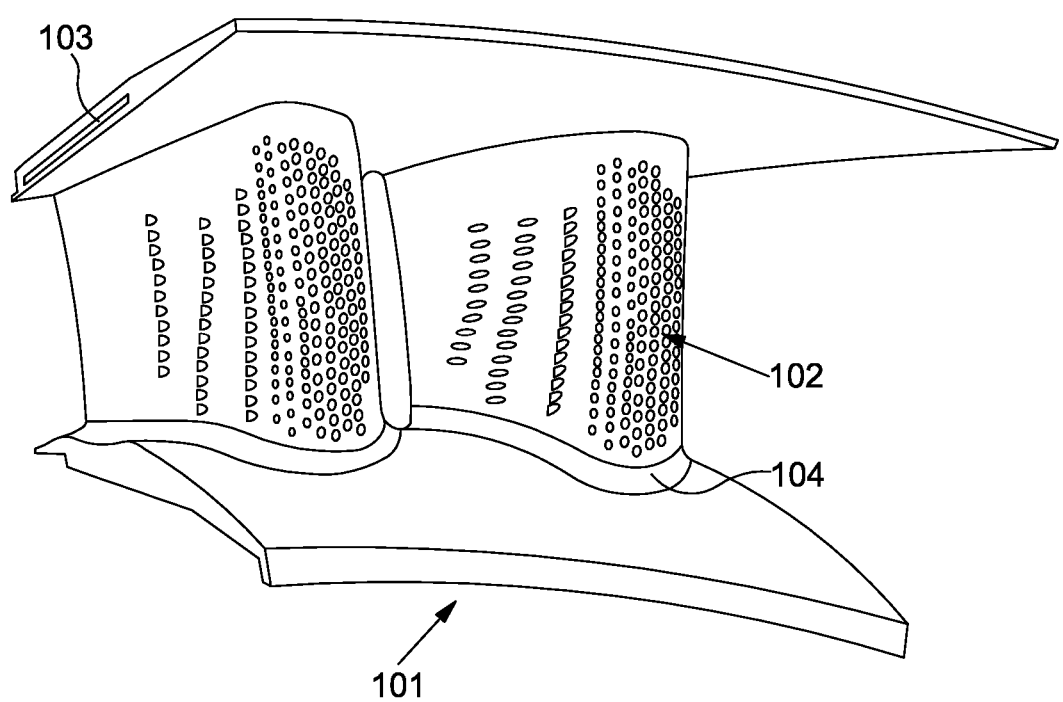
FIG. 1 shows a turbine vane that can be inspected using an embodiment of the invention.

With reference to FIG. 1 there is shown a turbine vane "vane" 101 having cooling holes 102 that the present invention can be used to inspect. The cooling holes 102 connect an internal cavity (not shown) with an external surface 104. The cooling holes transport a cooling fluid from the internal cavity to the external surface 104. The invention may also be used to inspect different features such as slots/openings 103 or coatings on the external surface 104 of the blade 101. Whilst the invention is discussed in relation to the inspection of a turbine vane, the invention may be used to inspect other components such as blades or any other machine component that incorporates features such as cooling holes, slots, or coatings. The term 'component' as used herein refers to such components.

Figure 2:
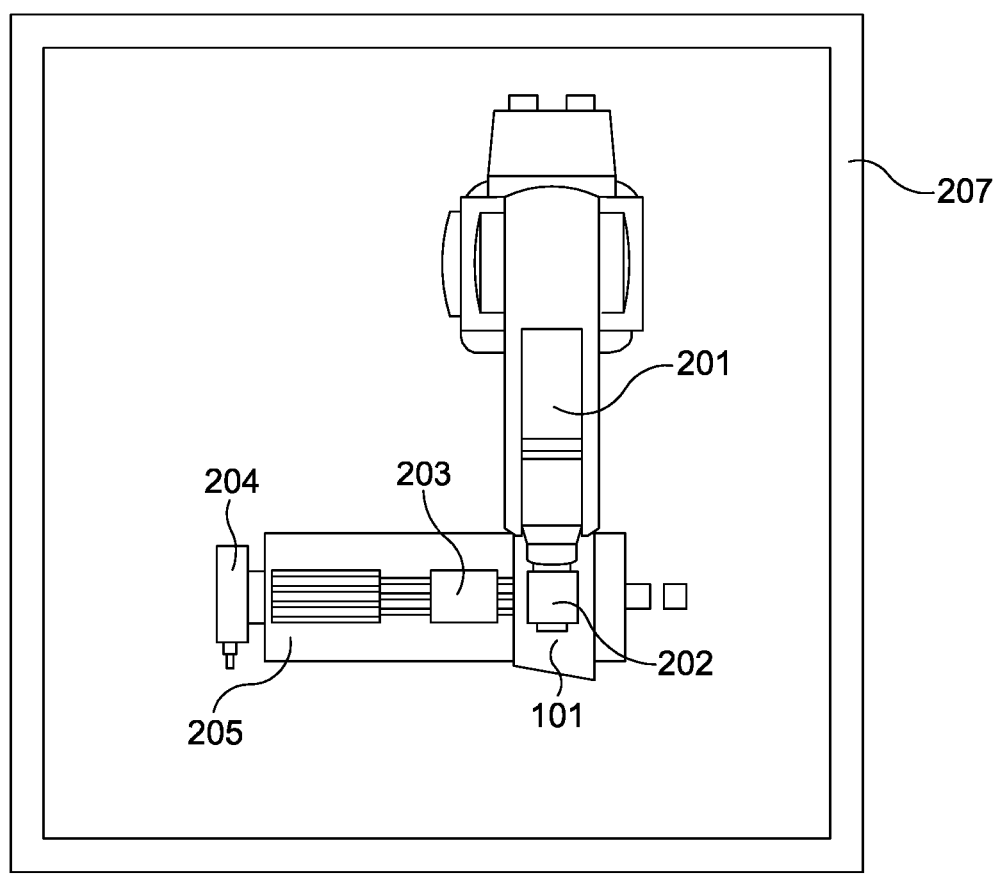
FIG. 2 shows a plan view of an embodiment of an inspection apparatus according to the invention.
Figure 3:
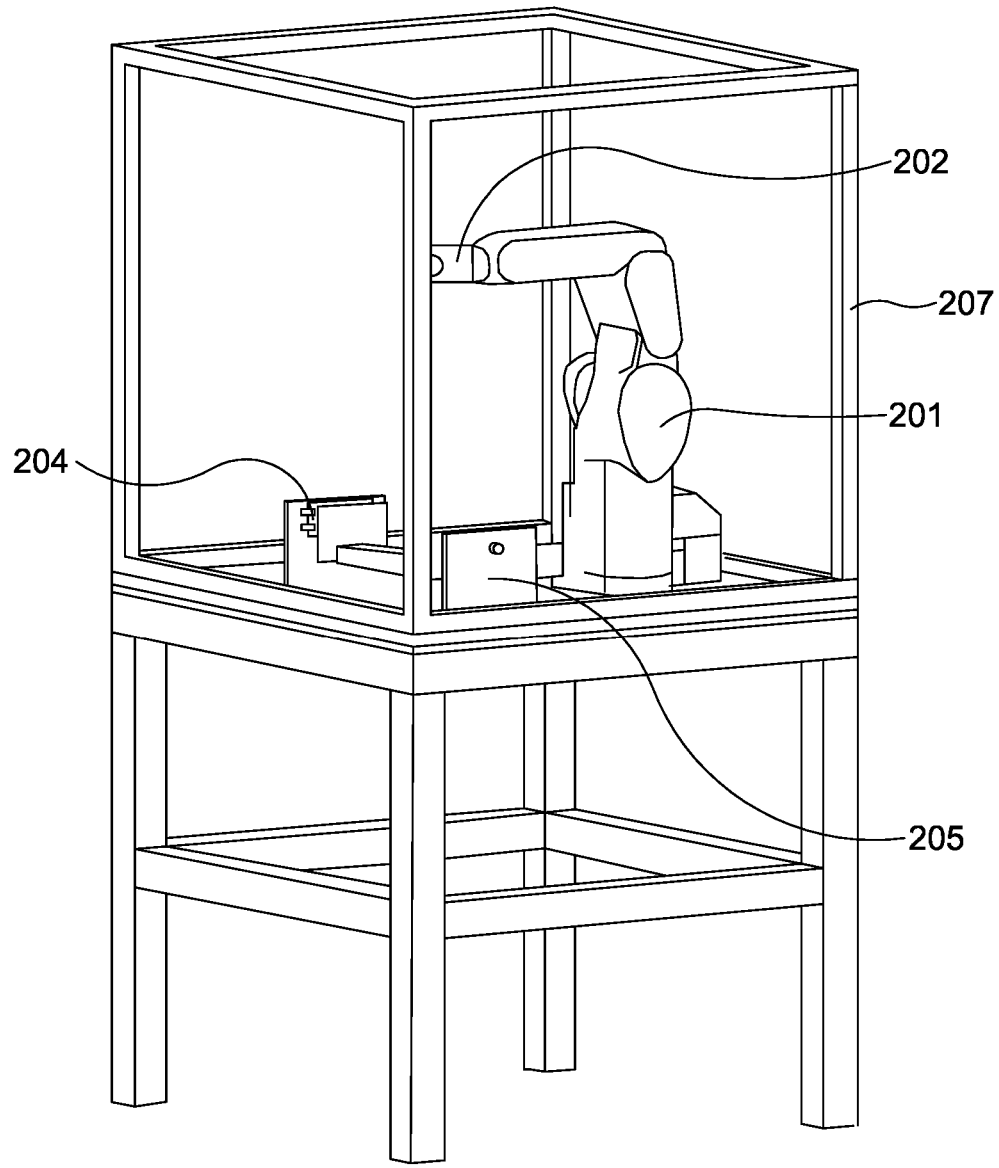
FIG. 3 shows an isometric view of the inspection apparatus of FIG. 1.
Figure 4:
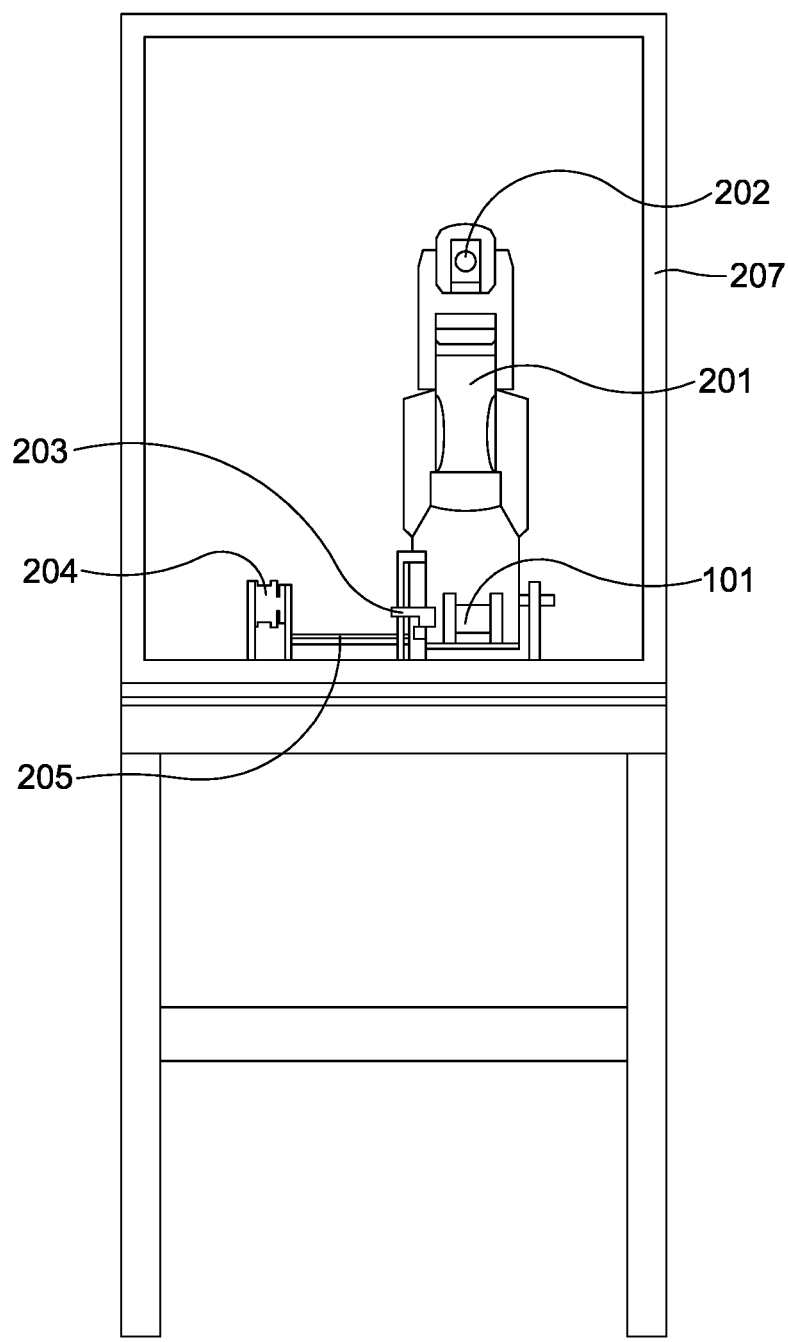
FIG. 4 shows a side view of the inspection apparatus of FIG. 1.

With reference to FIGS. 2 to 4 there is shown an apparatus for inspecting a blade or vane, such as the vane 101 of FIG. 1, in accordance with an embodiment of the invention. There is a robot 201 that supports a camera 202. The vane 101 is affixed to a base 205 that may be referred to as a fixture nest 205. A moveable light source 203 is controlled to shine light from within an internal passage (not shown in FIGS. 2-4) of the vane 101. The internal passage is accessible from a side surface (not shown in FIGS. 2-4) of the vane 101. The robot 201, fixture nest 205, light source 203 and other associated components discussed above are optionally placed within guarding box 207 to ensure safe operation.

Figure 5:
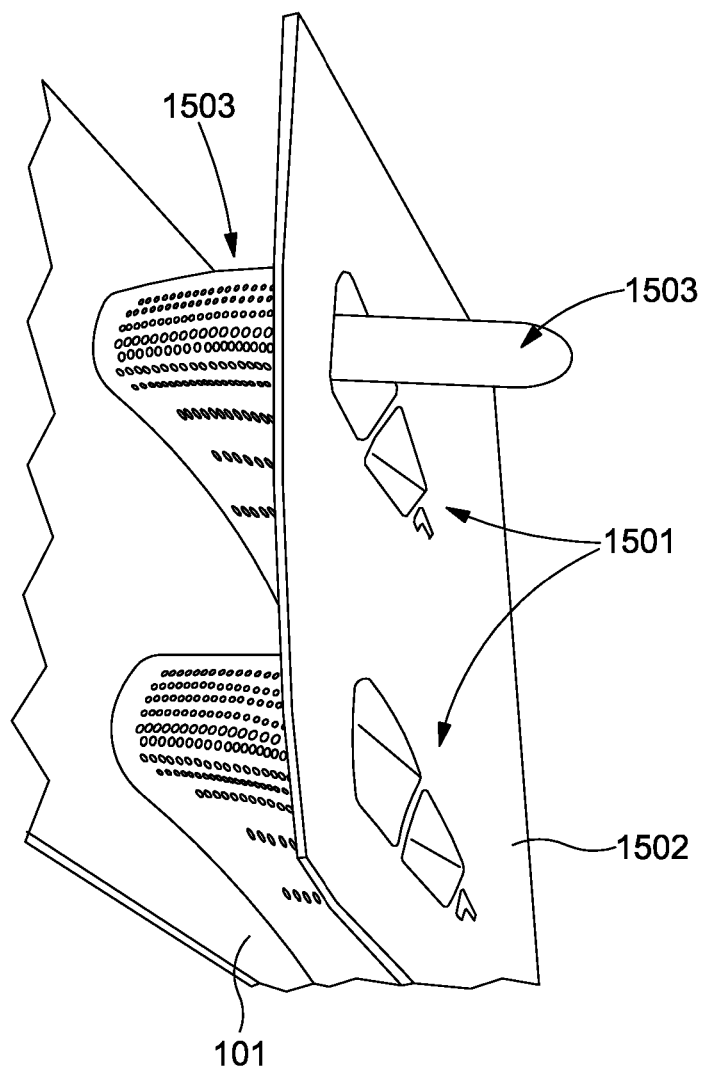
FIG. 5 shows a perspective view of a vane, which can be inspected using an embodiment of the invention, displaying access to internal passages.

With reference to FIG. 5 there is shown a perspective view of vane 101. It can be seen that there are internal passages 1501 on the side surface 1502. In the embodiment shown in FIGS. 2-4, the moveable light source (as represented by feature 1503) is inserted into one of internal passages 1501 thereby providing for light to shine through the cooling holes 102.

Figure 6:
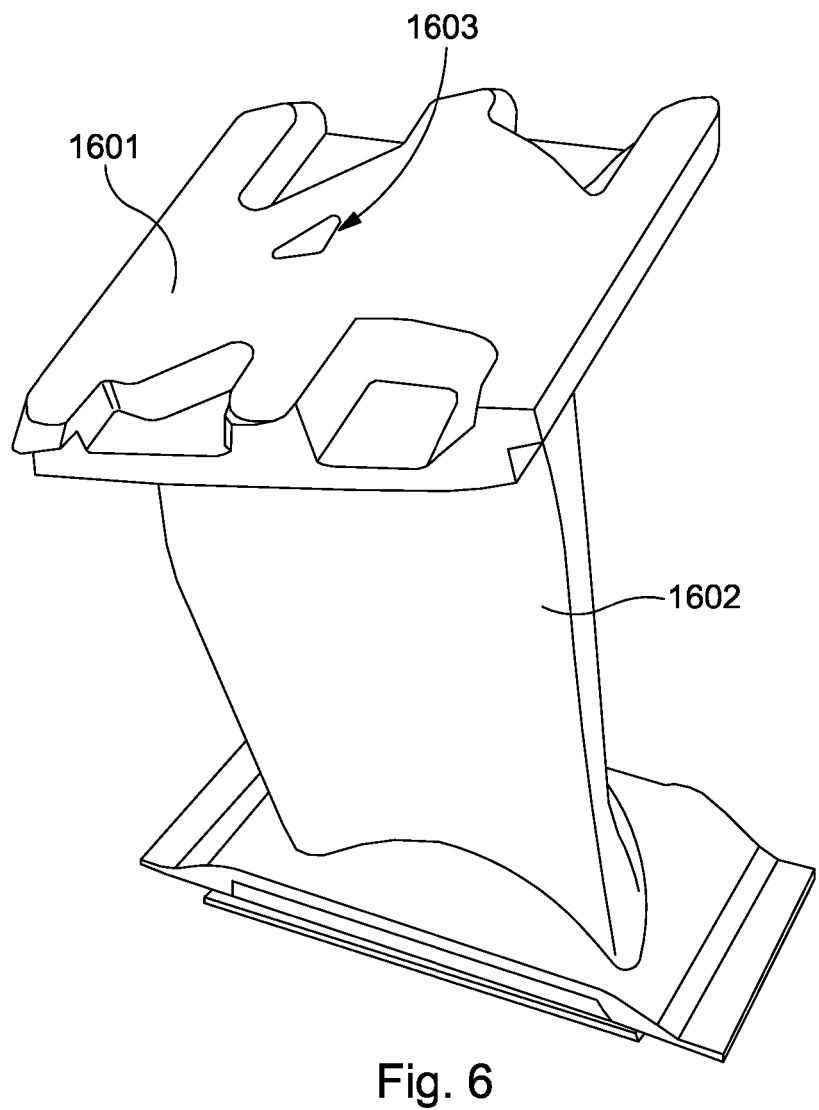
FIG. 6 shows perspective view of a blade, which can be inspected using an embodiment of the invention, displaying access to an internal passage.

With reference to FIG. 6 there is shown a perspective view of a blade 1601 that may also be inspected using the invention. The movable light source is inserted in internal passage 1603.

With continued reference to FIGS. 2-4, the robot 201 has the ability to move in 6-axes, i.e. it can move with 6 degrees of freedom, for positioning and directing a camera 202 that is attached to the robot 201. The camera 202 may comprise a telesentric lens for the purpose of eradicating or minimising light distortion. For example, the camera 202 may be a Teledyne® DALSA Genie Nano camera and may have a slim body length of 21 mm.

Figure 15:
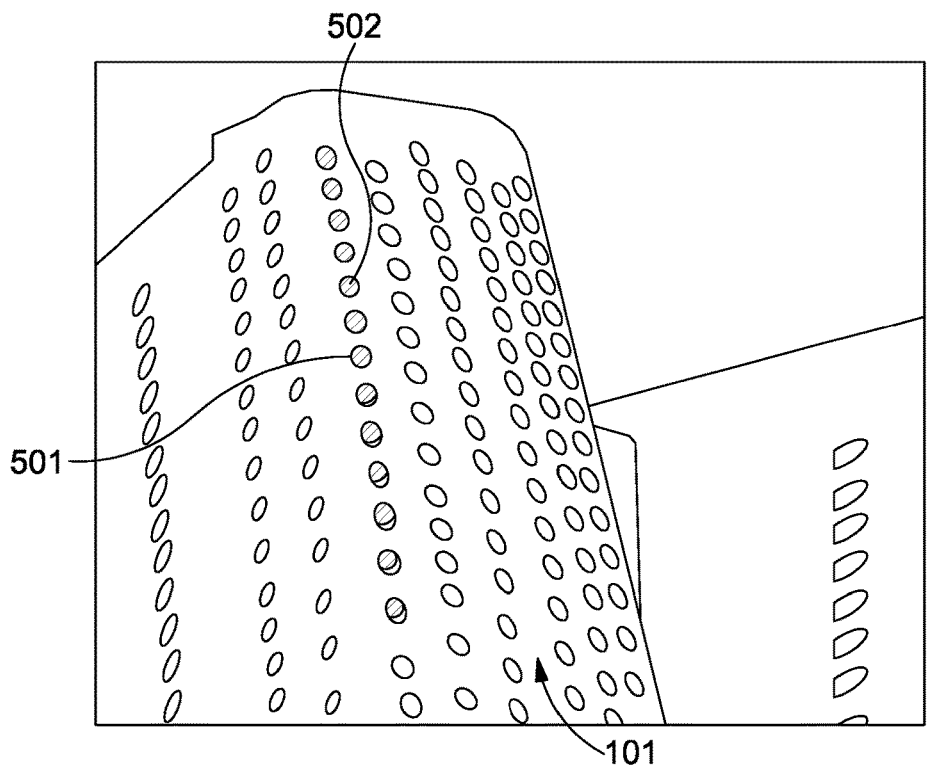
FIG. 15 shows a screenshot from a computer terminal showing an image of holes obtained using an embodiment of the invention.
Figure 16:
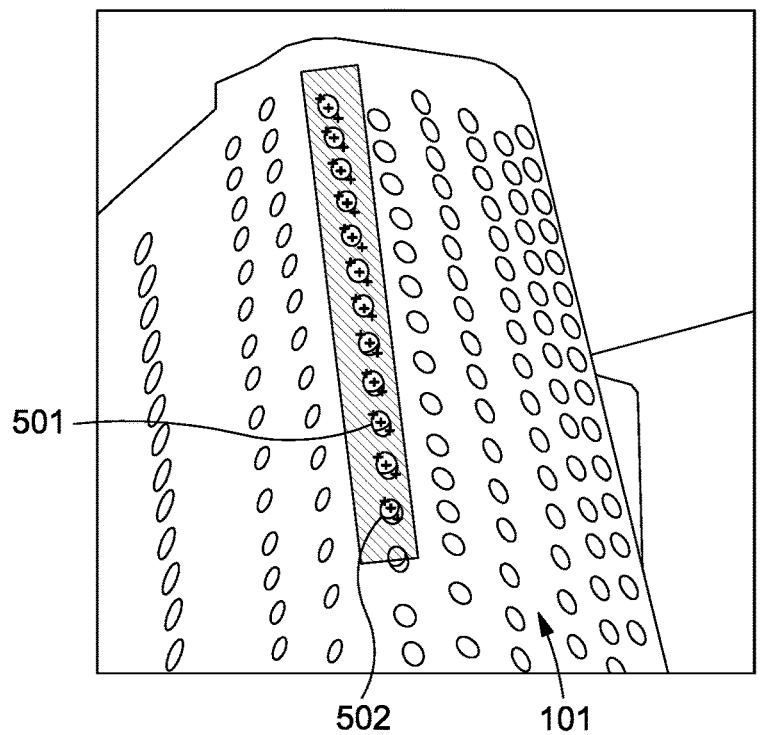
FIG. 16 shows a screenshot from a computer terminal showing a post-processed image of holes obtained using an embodiment of the invention.

Camera 202 is positioned facing the external surface of the blade 101 and receives the light that shines through cooling holes 102 thereby creating an image such as that shown in FIGS. 15 and 16. With continued reference to FIGS. 2-4, the robot 201 positions the camera 202 so that the optical axis of the camera 202 is aligned with the axis of a cooling hole that is to be imaged and inspected. Using this image, the inspection proceeds based on relevant measurements that are determined from post-processing of the image as will be discussed further below. The robot 201 then moves the camera 202 to align with the next cooling hole to be inspected.

The fixture nest 205 is optionally rotatable in order to aid inspection of cooling holes that are difficult for the camera to view within its range of motion. The combination of the rotation of the fixture nest 205, and 6 degrees of freedom movement ability of the camera 202 ensures that all cooling holes 102 may be inspected, even if the blade 101 has a complex surface topology.

If rotation is required, the fixture nest 205 is rotatable using a rotary servo 204 that is electrically actuated.

FIGS. 3 and 4 show the apparatus as described above from different viewpoints. Features in FIGS. 3 and 4 are labelled with reference numerals as used in FIG. 2.

As discussed above, the optical axis of the camera is aligned with the axis of a cooling hole that is to be imaged and inspected. Furthermore, the illumination source may be automatically moved to illuminate an internal passage. Features that provide this functionality are now described in more detail.

Figure 7:
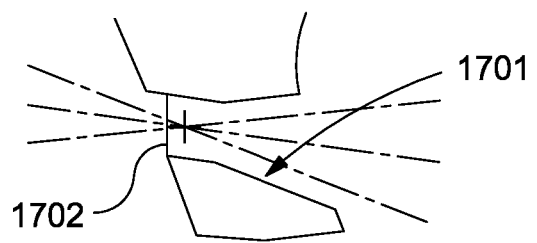
FIGS. 7 to 9 show cross-sectional views of cooling holes that can be inspected using embodiments of the invention.
Figure 8:
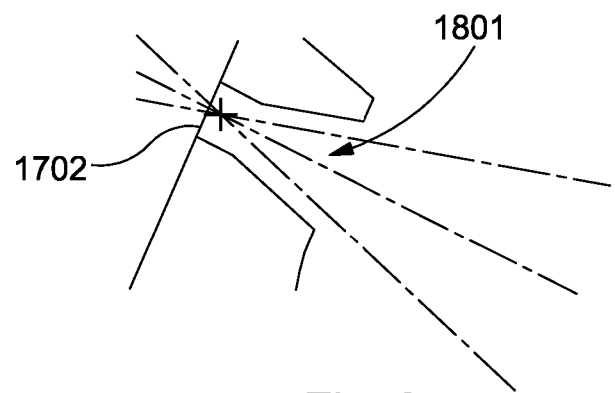
Figure 9:
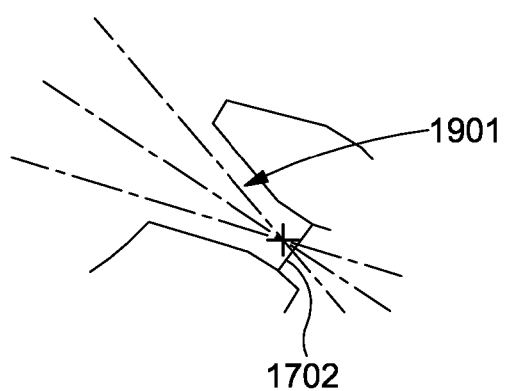

With reference to FIGS. 7-9 there are shown example positions of the break-through point 1702 within holes 1701, 1801, 1901 that are to be inspected. It can be seen that holes may have different profiles. The camera is aligned with each individual hole for inspection in order to take an image that is to be post-processed. The camera must be correctly aligned in a vector position such as that referenced by VT, VE, and WE in FIGS. 7-9 in order to capture an image suitable for measuring break-through point 1702. Positions VT, VE, and WE are external to the vane and allow the camera to receive light that shines through holes 1701, 1801, 1901 from the illumination source contained within the internal passage. It will be appreciated that the break-through point would not be visible using a conventional measuring technique involving use of a light source that shines light from the position of the camera since break-through point dimensions will be obscured by shadow and/or less visible due to angled internal walls of the hole.

Figure 10:
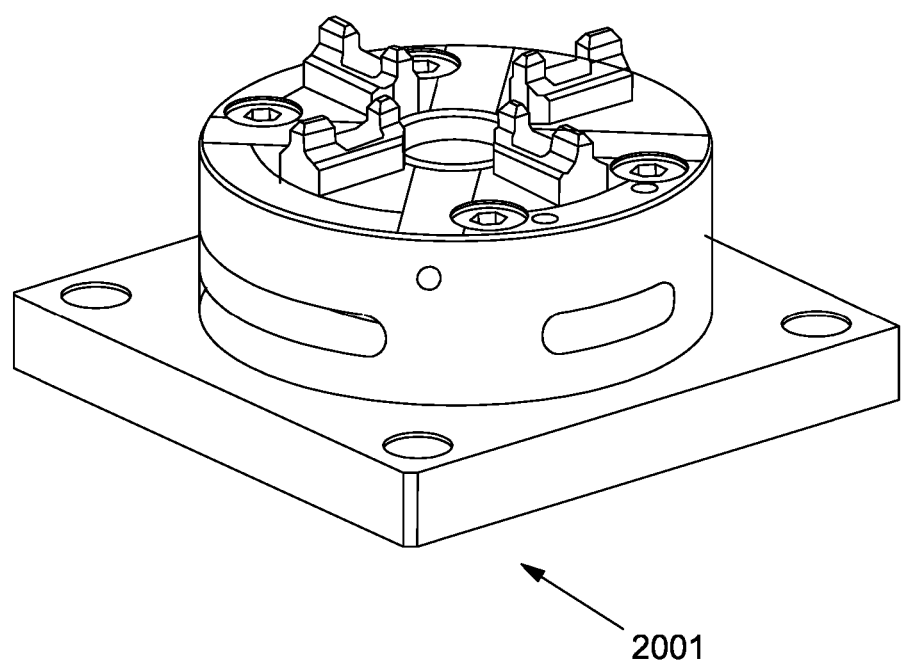
FIG. 10 shows a base upon which a blade or vane can be mounted.

With reference to FIG. 10 there is shown a base 2001 that can be used to support components such as blades or vanes that are to be inspected. The base 2001 holds components at a correct position for controllably moveable parts of the apparatus such as the camera and illumination means to be positioned correctly in order to operate.

In order for the camera and illumination source to be positioned correctly, a datum position of the base is determined. The base holds components so that relevant features are at known mechanical locations relative to the datum position of the base. CAD models stored in memory of the controller may be used for this purpose. By determining a datum position of the base, it is possible for the controller to ascertain the location of features on the blade in three dimensions for automatic positioning of the camera and illumination source. A known system such as the Erowa® system comprising an Erowa base may be used.

Figure 11:
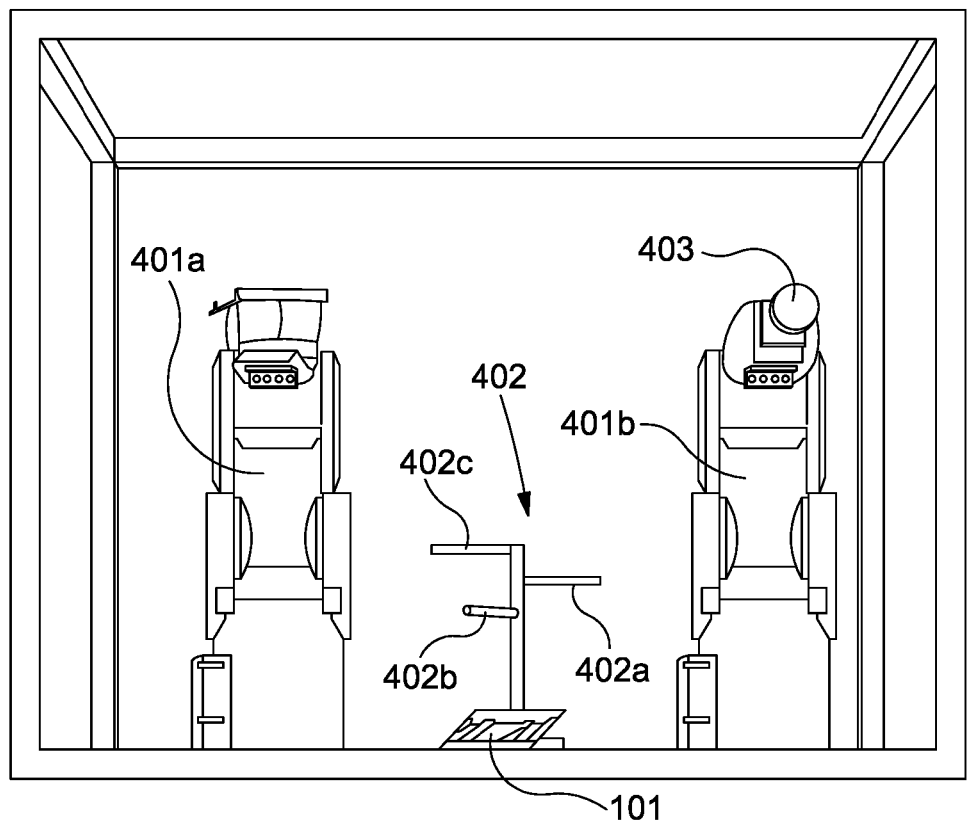
FIG. 11 shows a side view of an inspection apparatus embodiment of the invention where there are two robots.

FIG. 11 shows an alternative embodiment of the invention that includes a pair of robots comprising a gripping robot 401a and a camera robot 401b. Gripping robot 401a includes a gripping means (not shown). The gripping means is configured to have the ability to pick up (i.e. retrieve), move, and release vane 101. Camera robot 401b includes a camera 403. There is also a lighting fixture 402 that includes a plurality of illumination probes 402a, 402b, and 402c. In order to inspect a vane 101, gripping robot 401a is programmed (or instructed by a computing device (not shown)) retrieve the blade 101 using the gripping means (not shown) and present the blade to one of the illumination probes that are mounted on illumination fixture 402. The blade 101 is presented to an illumination probe in a position so that an internal passage (not shown) of the blade 101 is illuminated. This is achieved by positioning the vane 101 so that the illumination probe enters an internal passage of the vane 101. The illumination probes are individually switchable on and off to ensure that light only shines from the internal passage of vane 101 during inspection.

Once the blade has been positioned so that an internal passage is illuminated, the camera robot 401b proceeds to direct camera 403 towards features on the vane 101 that are to be measured, such as holes. As discussed above, the camera receives the light that shines through the holes and creates an image such as that shown in FIGS. 9 and 10. Relevant measurements are determined by post-processing this image as discussed below. Camera robot 401b is moved in order to align the optical axis of the camera 403 with the axis of a cooling hole that is to be measured. This is repeated in order to measure all cooling holes. Gripping robot 401a may move in order to position vane 101 in different positions to ensure that it is possible for all relevant features on vane 101 to be aligned with camera 403. After all relevant surface features are imaged/inspected, the gripping robot 401a may transport the vane 101 to a suitable repository of inspected blades. The gripping robot 401a may place inspected blades in different repositories corresponding to the number of failures that have been detected as a result of the inspection.

As shown in FIG. 11, the illumination probes 402a, 402b, and 402c are pointing in different directions and are therefore suitable to provide illumination to different parts of the vane 101 when considering the movement range of the gripping robot 401a. For example, if there are multiple internal passages of the vane 101 that commence from different sides of the vane 101. The gripping robot 401a is instructed to present the vane 101 to the illumination probe that is most suitable to enable illumination of the features that are to be inspected.

The robots may be synchronised so that the measuring process described above is fully automated. For example, a vane 101 may be retrieved and presented to an illumination probe by gripping robot 401a. Subsequently, camera robot 401b proceeds to position the camera 403 to take relevant images of features on vane 101. During this time, gripping robot 401a may adjust the position of blade 101 in order to ensure that all features are measured.

Whilst the embodiment shown in FIG. 11 includes a pair of robots, there may be further robots acting as either camera robots or gripping robots.

In the embodiment shown in FIG. 11, the illumination sources (illumination probes 402a, 402b, 402c) are static. However, in other embodiments such as that discussed with reference to FIGS. 2-4, the illumination source is controllably movable.

Figure 12:
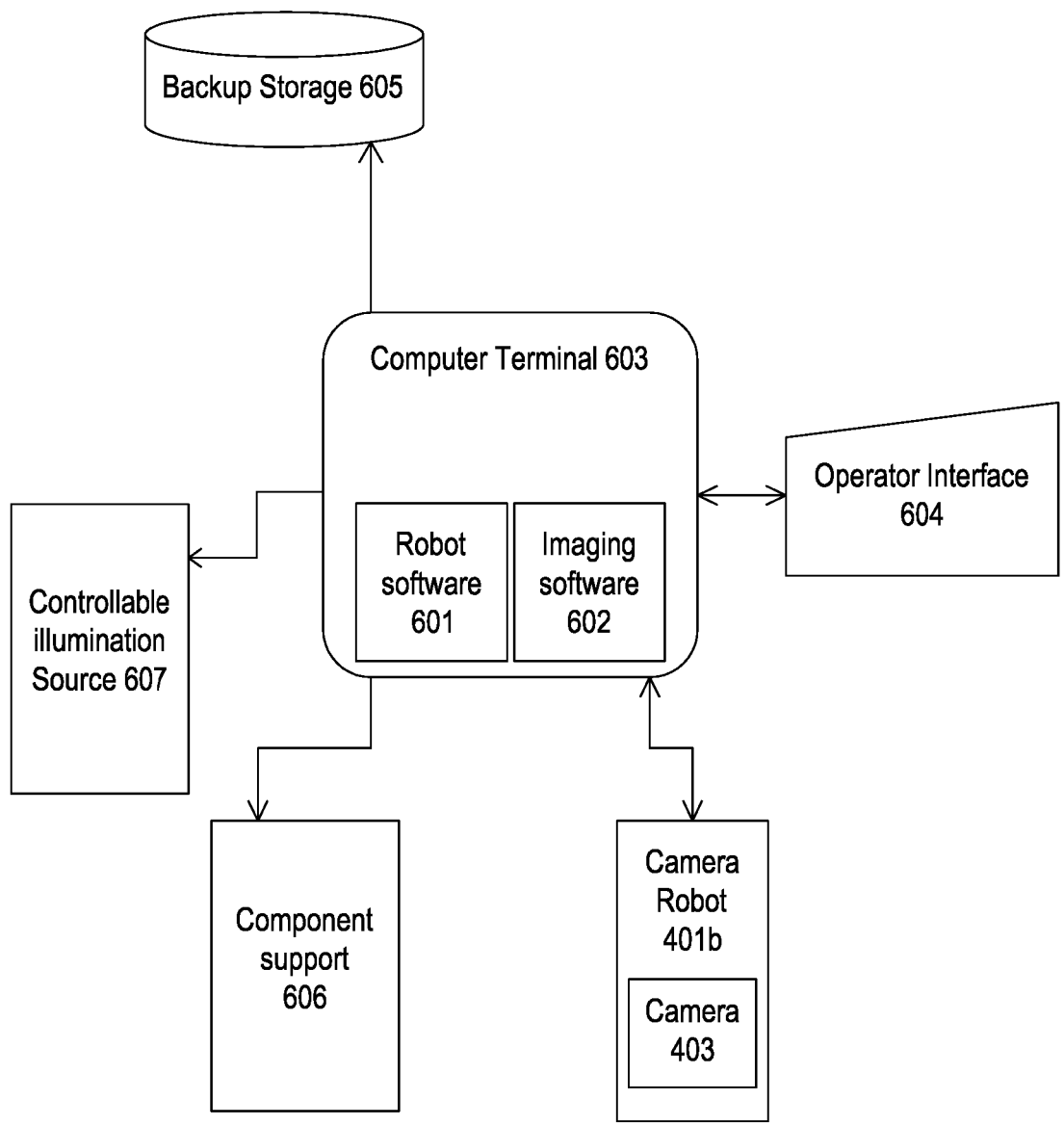
FIG. 12 shows a schematic diagram of devices within an inspection apparatus of FIGS. 1 to 5.

With reference to FIG. 12 there is shown a schematic diagram of an apparatus according to an embodiment of the present invention. A component support 606 for supporting components such as blades/vanes may be a fixture nest as shown in the embodiment of FIGS. 2-4, a gripping robot as shown in the embodiment of FIG. 5, or an Erowa base as shown in FIG. 10. The component support 606, a controllable illumination source 607, and a camera robot 401b are connected to a computer terminal 603. A camera 403 is integrated into camera robot 401b. The computer terminal comprises internal memory and a processor. Robot Software 601 and Imaging Software 602 are installed on the Computer Terminal 603. Backup Storage 605 and Operator Interface 604 are connected to the computer terminal 603. The camera robot 401b has an image output connection to computer terminal 603. The camera robot 401b is configured to receive camera movement instructions from computer terminal 603 based on instructions generated by Robot Software 601. The camera movement instructions may be based on known positions of features of the component to be imaged in relation to a datum point on an Erowa base. An operator provides instructions to the computer terminal 603 and receives a user output via operator interface 604. Computer Terminal 603 has Robot Software 601 and Imaging Software 602 installed on internal memory. It will be appreciated that Robot Software 601 and Imaging Software 602 could be installed on separate computer terminals that are connected via a network. Alternatively, they could both be part of a single software package.

Robot Software 601 runs using the processor of Computer Terminal 603 and provides outputs to one of the component support 606 and controllable illumination source 607. Outputs are also provided to camera robot 401b. These actions allow the camera to take appropriate images that have a contrast allowing for the features to be inspected by image post-processing. The resulting images taken by camera 403 are transferred to computer terminal 603, where they are post-processed by imaging software 602. The post-processing of images results in a part being determined to have passed or failed the inspection. Based on this information, a component movement instruction can be provided by Robot Software 601 to component support 606 resulting in a blade being placed in either a 'pass' repository or a 'fail' repository as appropriate. Data generated during this process is optionally stored in backup storage 605.

Figure 13:
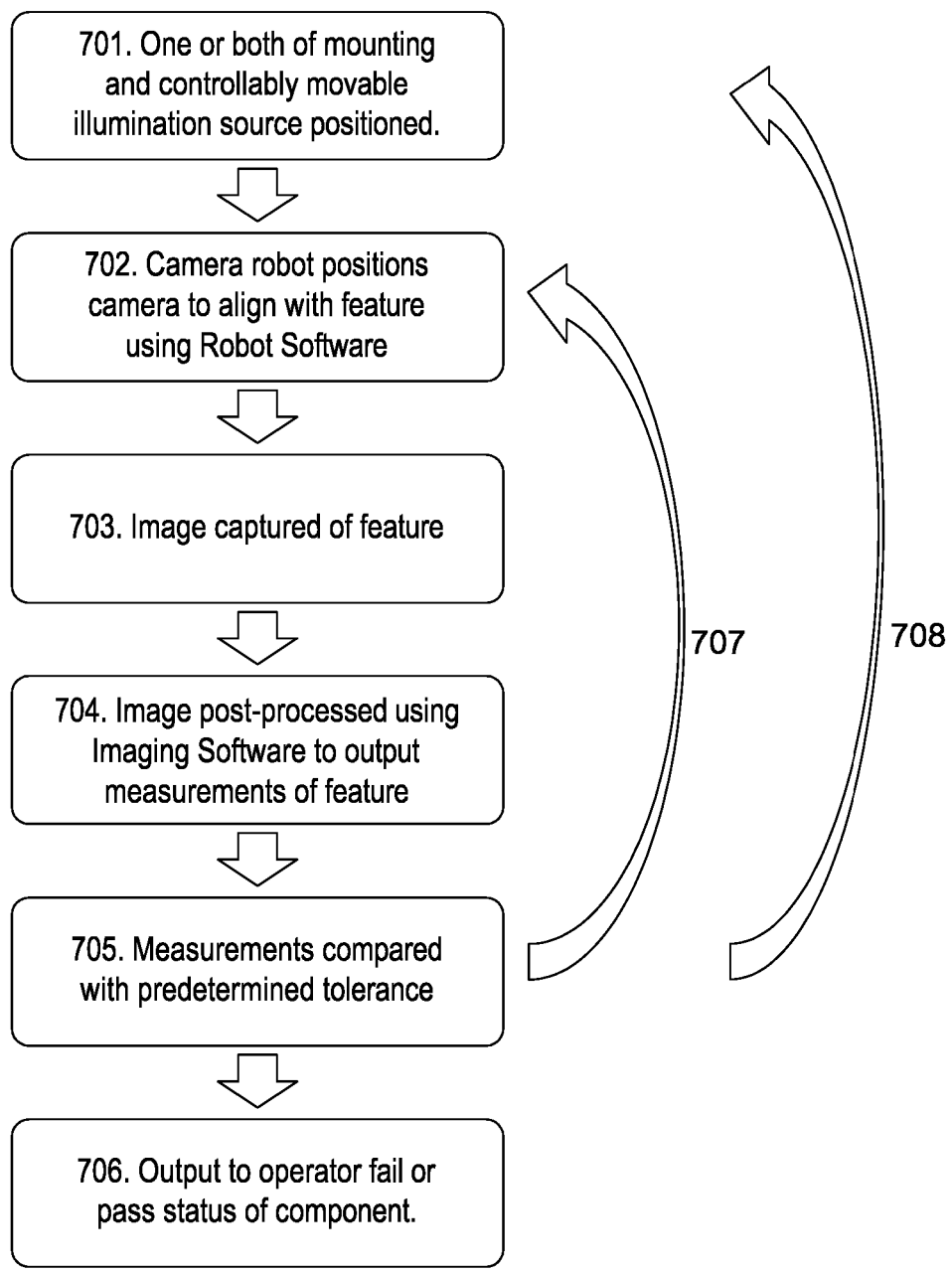
FIG. 13 shows a flow diagram of an inspection process undertaken by an inspection apparatus of FIGS. 1 to 5.

With reference to FIG. 13, there is shown an example inspection process associated with an apparatus of an embodiment of the invention.

At step 701, one or both of the mounting and illumination source are positioned to provide a contrast of illumination between a feature of the component and an adjacent surface of the component. During step 702, the camera robot positions the camera to align with a feature. Robot software on a computer terminal is used to provide instructions to appropriately move the camera robot.

During step 703, the camera on the camera robot captures an image of the feature. This image is transferred to the computer terminal. During step 704, the image is post-processed using imaging software running on the computer terminal. The post-processing provides for relevant measurements of features to be determined based on the captured image. Features such as the size of a hole at the break-through point, the level of coating, and the size/shape/position of slots can be determined.

During step 705, measurements are compared with a predetermined tolerance. If the measurements are within acceptable boundary levels as set by the predetermined tolerance, then the feature is deemed to have passed the inspection. Otherwise, the feature is deemed to have failed the inspection. If there is more than one feature to be inspected, the camera robot re-positions the camera to align with another feature after step 705, as indicated by process arrow 707. It may be necessary for the inspected component to be moved, or for the illumination source to be repositioned. In this case, the process 701 is repeated as indicated by process arrow 708. For example, the illumination source may be positioned in a different internal passage so that more features are illuminated for inspection. After all relevant features have been inspected, or during the inspection, the operator is notified of the results via an output from the computer terminal. In some embodiments this output is used to actuate the component support to place components in either a 'pass' or 'fail' repository depending on the result of the inspection.

Figure 14:
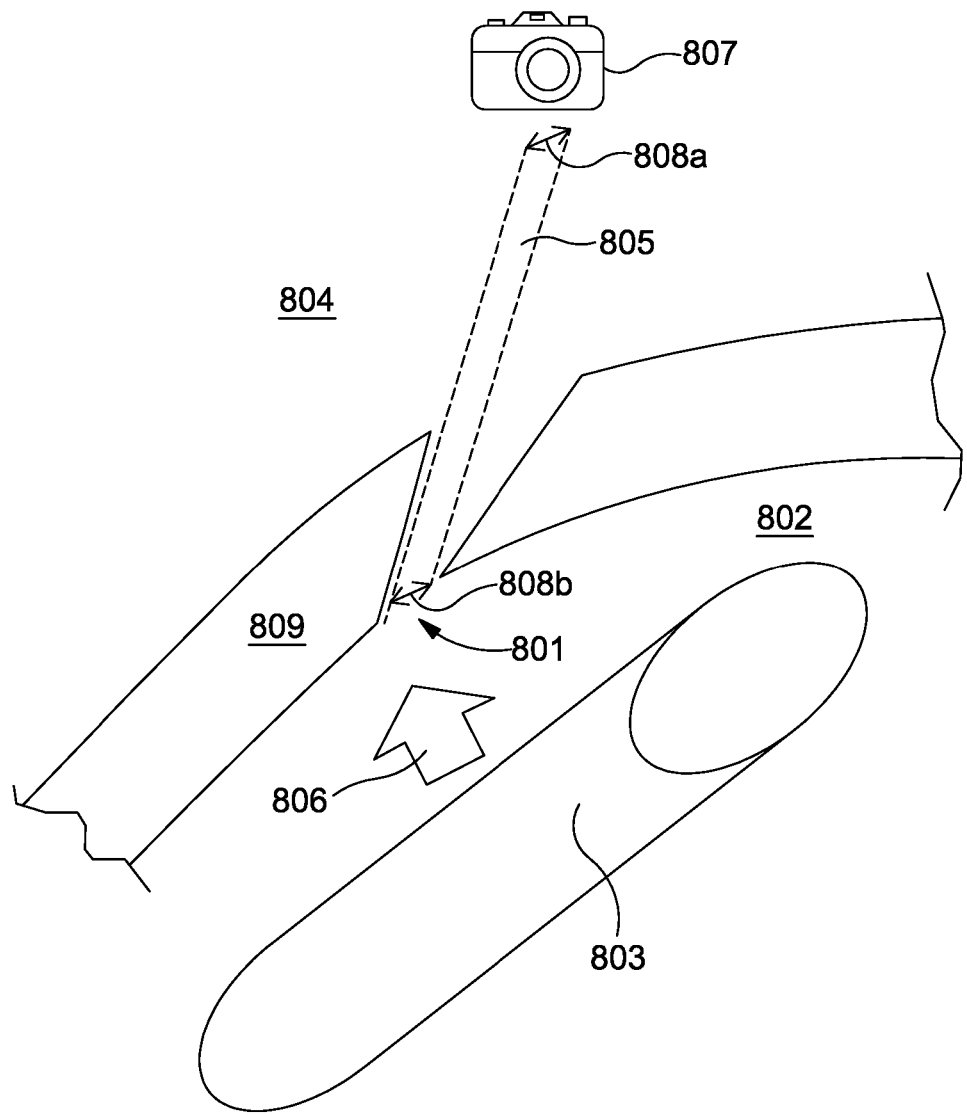
FIG. 14 shows a close-up cross-sectional representation of a wall of a component having a hole to be inspected by an inspection apparatus of FIGS. 1 to 5.

With reference to FIG. 14, there is shown a cross-sectional diagram of a hole that can be inspected using an embodiment of the invention. A component wall 809 separates the internal passage 802 of a component from an external area 804. There is a cooling hole 801 in the wall 809. Illumination probe 803 has been inserted inside the internal passage 802 and emits light 806. Camera 807 is mounted in the external area 804 on a camera robot (not shown). The optical axes of camera 807 has been positioned to be aligned with the axis of hole 801. Parallel dotted lines 805 represent a light beam emitted through the hole from illumination probe 803. Break-through point 808b is at the point where the hole 801 meets internal area 802. Usually this point is the smallest tightest part of the hole and where failures or manufacturing defects are most likely to occur.

In order to measure the dimensions of the hole at the break-through point 808b, light emitted through the hole from illumination probe 803 is captured by camera 807. As shown in FIG. 8, the edges of light beam 805 are substantially parallel. Therefore, it is possible to determine the size of breakthrough point 808b by post-processing the resulting image.

FIGS. 15 and 16 show example images from a computer terminal, as described above, that is running imaging software such as Dalsa Sherlock Vision. The computer terminal may be a personal computer and can be referred to as the controller. The computer terminal uses the imaging software to post-process images that have been taken by the camera and determine measurements of hole parameters based on the images. The post-processing allows the computer terminal to determine measurements of hole parameters based on images taken using a camera where an internal passage of a component has been illuminated, such as by using the illumination probes as discussed above.

FIG. 15 shows a raw image obtained by the camera 403. Illumination of the internal passage of the component provides for there to be a clear contrast between areas that comprise an aperture of the hole at the break-through point, and, the surrounding adjacent surface or walls of the hole.

It can be seen from FIGS. 15 and 16 that the robot(s) has aligned the optical axis of the camera 403 with the axis of a cooling hole that is to be measured 502.

FIG. 16 shows the image of FIG. 15 after it has been post-processed by the computer terminal using the imaging software to determine a definitive edge 501 of cooling hole 502. The definitive edge 501 is determined based on the change of contrast between the area of each hole through which light is shining, and the dark surrounding adjacent surface of the blade 101, or wall of the hole 502. This is the "break-through" point where failure is most likely to occur and therefore it is most desirable to measure the size of the hole at this point. As discussed above, the break-through point is the point at which the hole reaches a surface within the internal cavity. By providing illumination inside the internal cavity of the turbine blade or vane, the change of contrast between light and dark occurs at the circumference of the hole at the break-through point, as seen by the camera when it is aligned with the axis of the cooling hole.

The imaging software is programmed to measure a dimension of the hole 502 such as diameter at the break-through point using the definitive edge 501. The imaging software may be programmed to measure dimensions such as the width and height of the hole as defined by the definitive edge 501. The shape of the hole 502 can be determined and compared with a predetermined shape that the hole 502 is expected to be such as a perfect circle.

Figure 17:
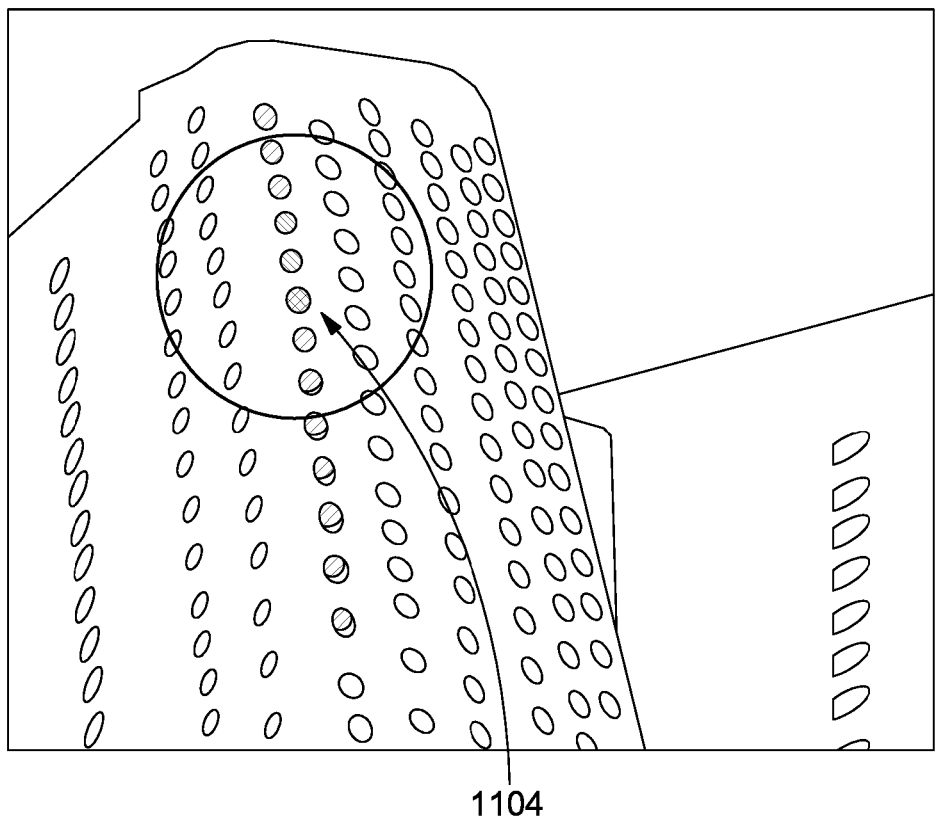
FIG. 17 shows a screenshot from a computer terminal showing a post-processed image of holes obtained using an embodiment of the invention, including colour coded analysis of failure.

With reference to FIG. 17, the software may display an output image to an operator where holes 1104 are colour coded based on whether the dimensions that have been determined are within pre-set tolerances. For example, holes where a diameter at the break-through point is too large or too small (i.e. outside the pre-set tolerance) may be coloured red. This allows the operator to obtain an overview of how many holes are within the pre-set tolerance. The software may be configured to send instructions to the robot(s) to retain blades (i.e. place in a "fail" repository) that have failed the inspection. Blades may fail the inspection based on one or both of the number of hole measurements outside the pre-set tolerance, and, the degree to which any measurements are outside the pre-set tolerance.

The software is optionally configured to store data relating to each inspected blade on a hard drive or server.

The component can be positioned so that an adjacent surface is illuminated. In other words, illumination is provided by a source such as an illumination probe that is not inside an internal passage of the blade. Instead, the illumination source shines light onto the adjacent surface from a position facing this surface. This provides for the controller to inspect a level of coating on the adjacent surface.

Figure 18:
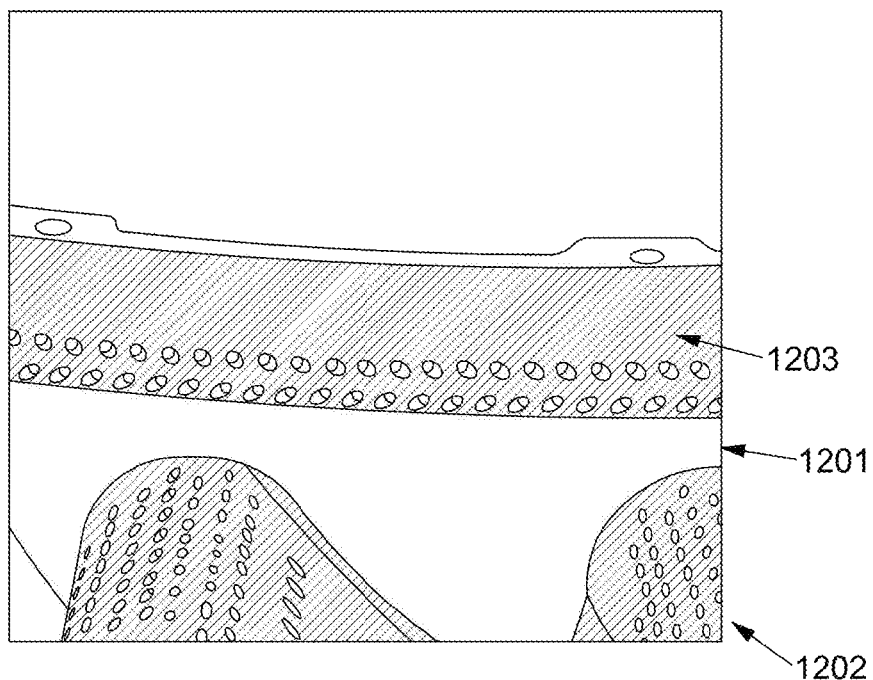
FIG. 18 shows a screenshot from a computer terminal showing an image of surface coatings obtained using an embodiment of the invention.

With reference to FIG. 18 there is shown a typical image taken by the camera when the controller is configured to inspect a coating level. The holes are shown as being dark because the light source is facing the adjacent surface, and, the internal passage that the holes lead to is not illuminated. In the example shown in FIG. 18, three areas 1201, 1202, and 1203 are identifiable based on the contrast and differing tones of the image. It is possible to determine the coating level based on the tone shown on a surface within the image. In this example, surface areas 1202 and 1203 have a thin coating since the tone is darker. Surface area 1201 has a thicker coating since the tone is lighter.

Figure 19:
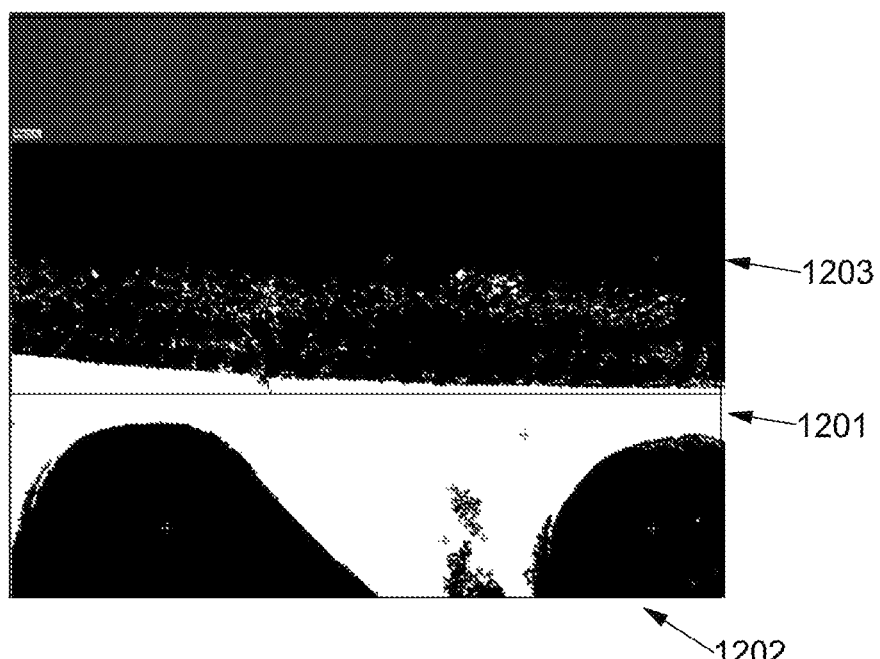
FIG. 19 shows a screenshot from a computer terminal showing a post-processed image of surface coatings obtained using an embodiment of the invention.

With reference to FIG. 19 there is shown an example output of the controller after post-processing the image shown in FIG. 18 based on tone. Illumination may be applied in a consistent and controlled manner allowing the camera to detect how much light is being reflected from the surface of the blade. There is a direct relationship between the amount of coating applied and the amount of light that is reflected back into the camera. The amount of light received by the camera from any point on the surface can be calibrated to the coating thickness when the optical axis of the camera is directed towards the coated surface in a given direction (e.g. angle of the optical axis of the camera to the surface). In the output shown in FIG. 18, each pixel has a value of between 0 and 255 depending on the tone, 0 being black and 255 being white. A coating percentage is applied between 0 and 100% based on the pixel value within the image. Pixel values can be calibrated based on samples that have been predetermined to correlate to different percentages.

The black ("fail") areas 1202, 1203 represent areas where the coating level is too thin based on a pre-set tone limit. The pre-set tone limit may be set where it has been predetermined what tone represents a coating level that is too thin. The white ("pass") area 1201 represents an area where the coating level is sufficient. The software may be configured to colour-code areas depending on the coating level.

Figure 20:
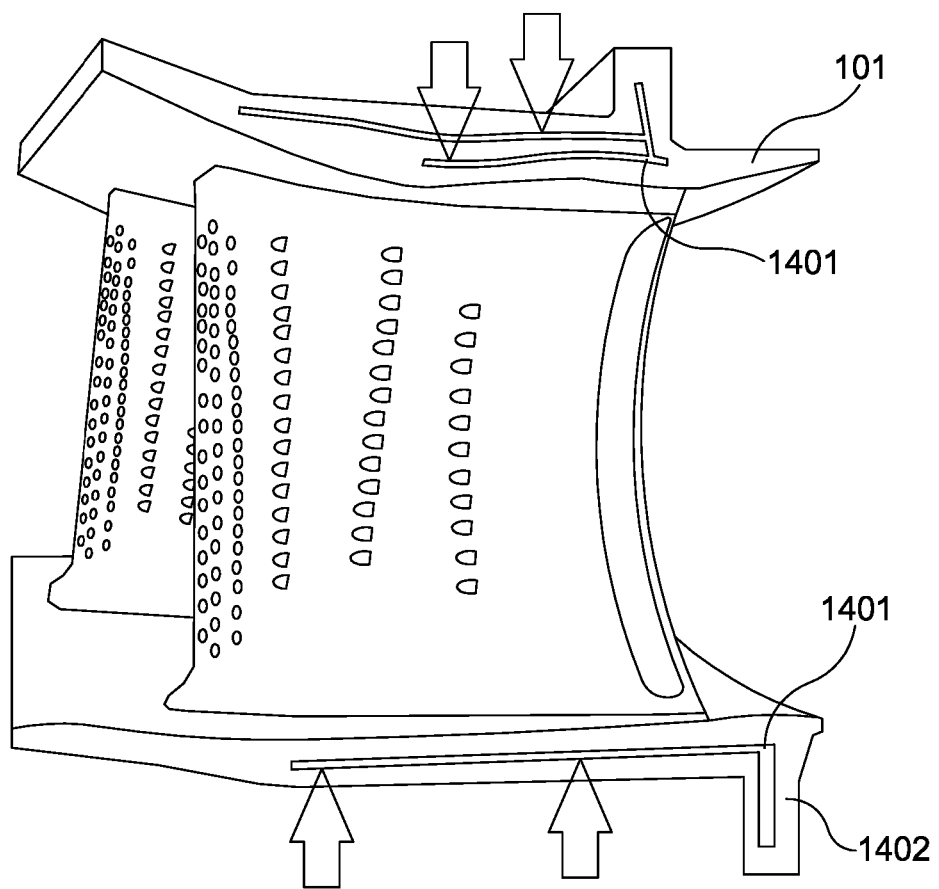
FIG. 20 shows slots of a vane that are inspected using an embodiment of the invention.

With reference to FIG. 20 there is shown a vane 101 having slot features 1401. The controller may be configured to move one or more of the mounting and illumination source such that a surface 1402 adjacent to the slot features 1401 is illuminated. The controller determines measurements relating to the size of the slots 1401 utilising the definitive edges of the slots as is clear from the contrast of an image obtained using the camera.

The robots used as part of the controller may be a 6-axis Kuka or Mitsubishi Robot. The computer software may run on a computer terminal being a personal computer that is part of the controller. The controller and/or computer terminal may be programmed using the C or C+ language. The controller may also be a ladder based PLC system.

Figure 21:
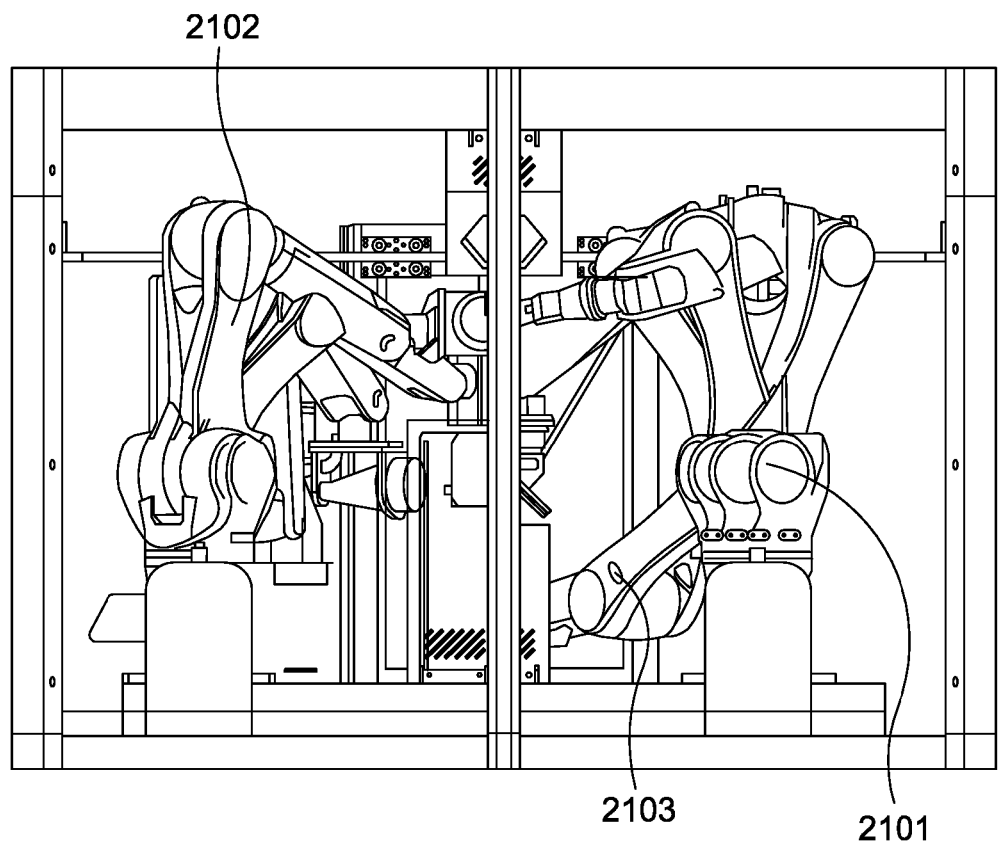
FIG. 21 shows a side view of an apparatus according to an embodiment of the invention.
Figure 22:
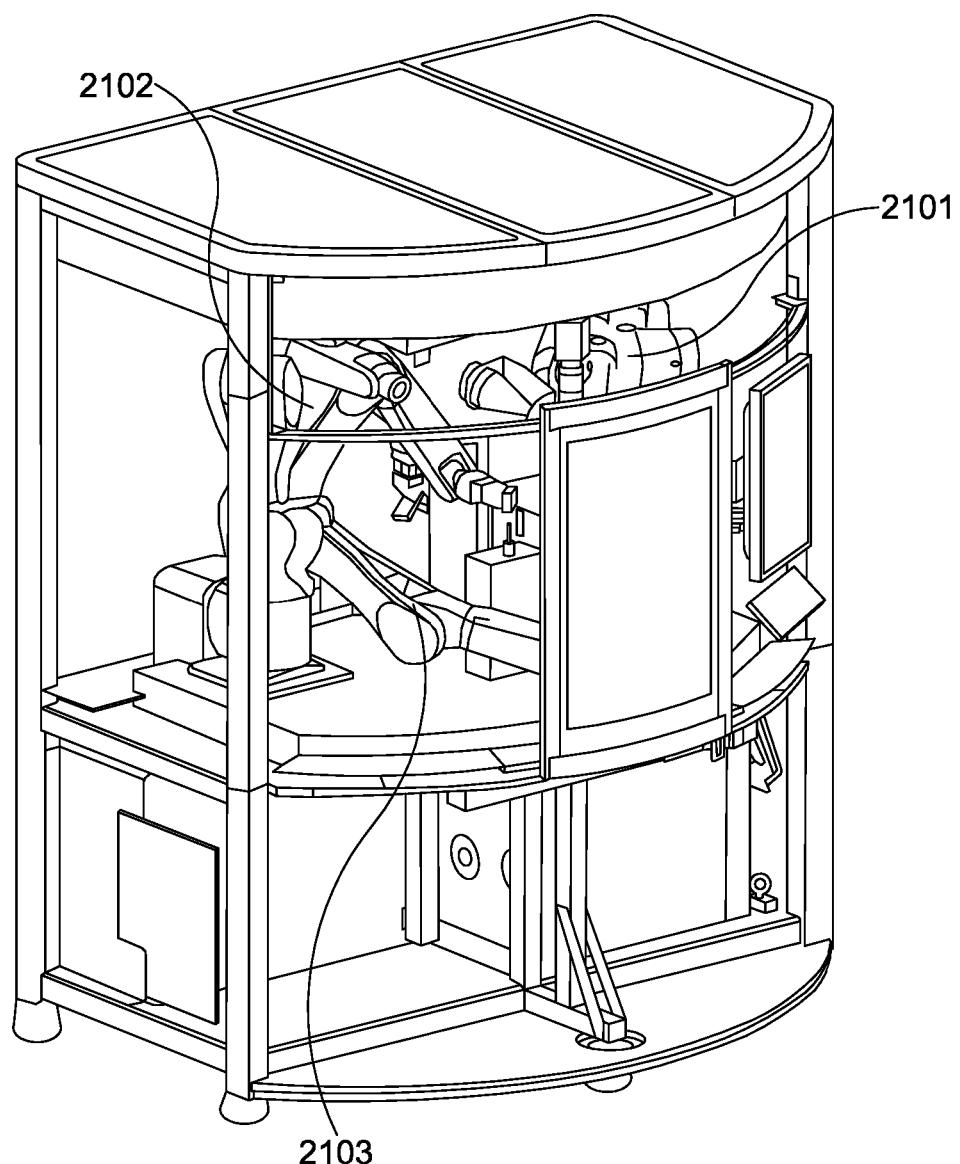
FIG. 22 shows an isometric view of an apparatus according to an embodiment of the invention.

With reference to FIGS. 21 and 22, three robotic arms 2101, 2102, and 2103 are located proximal to one another. Each robotic arm positions one of a camera, mounting, or illumination device. In examples, only two of the camera, mounting, or illumination device are mounted on robotic arms.

Figure 23:
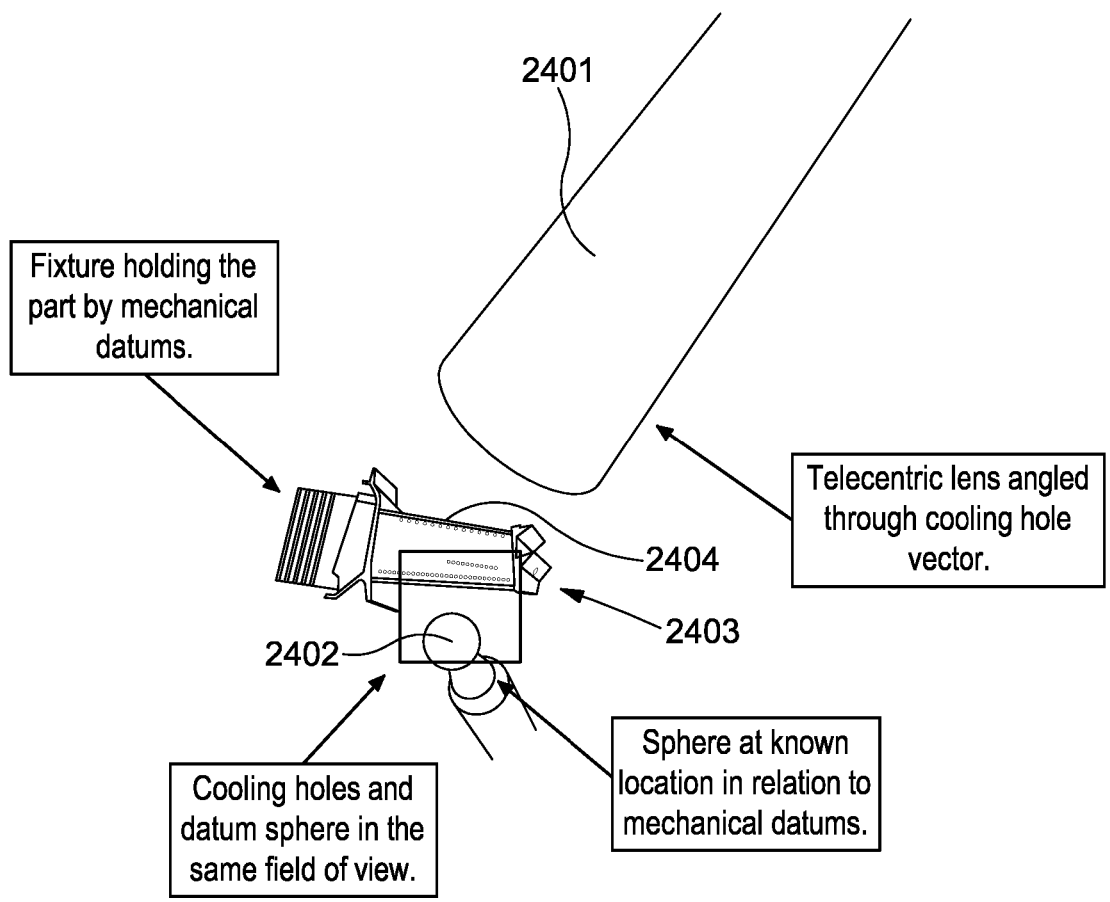
FIG. 23 shows an example datum point for determining a position of a mounting according to an embodiment of the invention.

With reference to FIG. 23, a datum sphere 2402 is positioned at a known position relative to a mounting (not shown). The mounting (not shown) holds a turbine blade or vane (2403). The position of the mounting (and therefore coordinate positions of features of the turbine blade or vane) are determined based on the position of the datum sphere 2402 as determined by a camera 2401. Components of the apparatus can be moved as discussed above so that the optical axis of the camera 2401 is aligned with a centreline of one or more cooling holes 2404 on the turbine blade or vane 2403.

The invention claimed is:

1. A turbine blade or vane inspection apparatus for use during a manufacturing process, comprising:
   a mounting for holding a turbine blade or vane;
   a source of illumination;
   a camera;
   a controller;
   wherein at least two of the source of illumination, the camera, and the controller are moveable components; and,
   wherein the controller is configured to:
      control the movable components to (a) position the turbine blade or vane mounted thereon relative to the illumination source so as to provide a contrast of illumination between a cooling hole in the turbine blade or vane and an adjacent surface of the blade or vane and (b) position the camera so that the optical axis of the camera is directed towards the cooling hole so that the optical axis of the camera is aligned with a centerline of the cooling hole; and
      measure a size of a profile of the cooling hole at the break-through point as the narrowest point of the cooling hole, the measurement being based on an image obtained by the camera;
      wherein the illumination source comprises an illumination probe and the controller is configured to move one or both of the mounting and illumination probe to position the turbine blade or vane so that the illumination probe enters the internal passage of the turbine blade or vane and radiation from the illumination probe shines out from the internal passage through the cooling hole in the turbine blade or vane.

2. The apparatus according to claim 1 wherein the illumination source comprises a fibre optic light source.

3. The apparatus of claim 1, wherein the controller is configured to determine a circumference size and/or shape of the cooling hole at or proximal to the location where the cooling hole joins the internal passage.

4. The apparatus of claim 1 wherein the controller is configured to determine a definitive edge of a profile of one or more cooling hole(s) based on the change of contrast in the image caused by radiation from the illumination probe.

5. The apparatus of claim 1 wherein the apparatus is configured for the camera to receive the radiation from the illumination probe after the radiation has passed through the cooling hole(s).

6. The apparatus according to claim 1 wherein the controller is further configured to control the moveable components to (a) position the turbine blade or vane so that the illumination source illuminates a coated surface of the blade or vane, and (b) to position the camera so that the optical axis of the camera is directed towards the illuminated surface, and wherein the controller is further configured to determine an acceptable or unacceptable thickness of coating based on radiation reflected from the illuminated surface.

7. The apparatus according to claim 5 wherein the controller is configured to determine an acceptable or unacceptable thickness of coating based on a predetermined relationship between the amount of coating applied and corresponding amount of radiation reflected from the illuminated surface.

8. The apparatus according to claim 1 wherein the feature of the turbine blade or vane is a slot or opening in the adjacent surface of the blade or vane, and the controller is configured to control the moveable components to (a) position the turbine blade or vane so that the illumination source illuminates the surface, and (b) to position the camera so that the optical axis of the camera is directed towards the slot or opening, and wherein the controller is further configured to determine the shape of the opening based on the image obtained by the camera.

9. The apparatus according to claim 1, wherein:
the mounting comprises a datum point and the controller determines the position of the mounting based on the position of the datum point;
the controller comprises memory that stores coordinate positions of features of the blade or vane with respect to the datum point; and
the controller is configured to move any of the camera, mounting, and illumination source based on the position of the mounting and stored coordinate positions.

10. A method for inspecting a turbine blade or vane during a manufacturing process, the method comprising the steps of:
controlling moveable components being at least two of a mounting for holding a turbine blade or vane, a camera, and an illumination source, to position the turbine blade or vane relative to the illumination source so as to provide a contrast of illumination between a cooling hole of the turbine blade or vane and an adjacent surface of the blade or vane;
controlling the moveable components so that the optical axis of the camera is directed towards the cooling hole so that the optical axis of the camera is aligned with a centerline of the cooling hole; and
measuring a size of the profile of the cooling hole at the break-through point as the narrowest point of the hole, the measurement being based on an image obtained by the camera; and
wherein the illumination source comprises an illumination probe; and further comprising the step of controlling the movable components to position the turbine blade or vane so that the illumination probe enters an internal passage of the turbine blade or vane and radiation from the illumination probe shines out from the internal passage through one or more cooling holes in the turbine blade or vane.

11. The method according to claim 10 wherein the illumination source comprises a fibre optic light source.

12. The method according to claim 10 further comprising the step of determining a definitive edge of a profile of the cooling hole(s) based on the change of contrast in the image caused by light illuminated from the illumination probe.

13. The method according to claim 12 further comprising the step of post-processing the image using imaging software installed on a computing device to determine the definitive edge and use data associated with the definitive edge to determine the dimension and/or shape of the cooling hole(s).

14. The method according to claim 13 further comprising the step of comparing the dimension and/or shape with a predetermined tolerance range in order to determine if the dimension and/or shape is acceptable or unacceptable.

15. The method according to claim 10 further comprising the step of receiving the radiation from the illumination probe after the radiation has passed through the cooling hole(s).

16. A system for inspecting a turbine blade or vane during a manufacturing process, the system comprising:
a computer terminal having installed software that post-processes images to measure a size of a profile of a cooling hole in a turbine vane or blade at the break-through point as the narrowest point of the cooling hole, the measurement being based on a contrast of illumination between the cooling hole of the turbine blade or vane and an adjacent surface of the blade or vane; and
one or more robots for controllably moving at least two of a camera, a mounting for holding a turbine vane or blade, and an illumination source so that the optical axis of the camera is directed towards the cooling hole so that the optical axis of the camera is aligned with a centerline of the cooling hole;
wherein the illumination source comprises an illumination probe and a controller of the one or more robots is configured to move one or both of the mounting and illumination probe to position the turbine blade or vane so that the illumination probe enters the internal passage of the turbine blade or vane and radiation from the illumination probe shines out from the internal passage through the cooling hole in the turbine blade or vane.

17. The system according to claim 16 wherein the one or more robots comprises a camera robot for controllably moving a camera, and a component support robot for controllably moving the mounting.

18. The system according to claim 16 wherein the robots are controlled by the computer terminal, or a further secondary computer terminal utilizing robot software.

19. The system according to claim 16 wherein the one or more robots are configured to move the at least two of the camera, the mounting for holding the turbine vane or blade, and an illumination source, by reference to stored coordinates positions of features on the turbine blade or vane with respect to a measurable datum point on the mounting.

20. A turbine blade or vane coating inspection apparatus comprising:
a mounting for holding a turbine blade or vane;
a source of illumination for illuminating a coated surface of the turbine blade or vane;
a camera; and
a controller, wherein at least one of the mounting, the source of illumination and the camera is controllably moveable, and wherein the controller is configured to:

control movement of one or more of the mounting, the source of illumination and the camera so that the optical axis of the camera is directed towards the coated surface of the turbine blade or vane in a predetermined direction; and determine an acceptable or unacceptable thickness of coating based on:

light from the illumination source that is reflected from the illuminated surface as determined from an image obtained by the camera; and a predetermined relationship between the amount of coating applied and corresponding amount of light reflected from the illuminated surface.

21. The apparatus according to claim 20 configured to determine a coating thickness percentage value for each pixel in the image by determining a pixel brightness value and comparing the pixel brightness value with stored coating percentage values using the predetermined relationship.

22. The apparatus according to claim 20 configured to be trained to differentiate between coatings based on stored coating image profiles determined from images of samples having acceptable and unacceptable coating levels.

* * * * *